United States Patent [19]

Harada et al.

[11] Patent Number: 5,084,422
[45] Date of Patent: Jan. 28, 1992

[54] POTASSIUM HEXATITANATE FIBERS HAVING TUNNEL STRUCTURE, PROCESS FOR PRODUCING THE SAME, AND COMPOSITE MATERIAL CONTAINING SAID FIBERS

[75] Inventors: Hidefumi Harada; Yasuo Inoue, both of Yamaguchi, Japan

[73] Assignee: Titan Kogyo Kabushiki Kaisha, Yamaguchi, Japan

[21] Appl. No.: 263,072

[22] Filed: Oct. 27, 1988

[30] Foreign Application Priority Data

Dec. 25, 1987 [JP] Japan .................................. 62-329338
Jun. 3, 1988 [JP] Japan .................................. 63-137110

[51] Int. Cl.$^5$ ............................................. C04B 35/02
[52] U.S. Cl. .................................... 501/95; 423/387
[58] Field of Search .................. 501/95; 106/286.2; 423/598; 428/386, 387

[56] References Cited

U.S. PATENT DOCUMENTS

| | | | |
|---|---|---|---|
| 3,956,006 | 5/1976 | Winter et al. ........................ | 106/442 |
| 4,810,439 | 3/1989 | Fujiki et al. ......................... | 423/598 |

FOREIGN PATENT DOCUMENTS 60-104522  6/1985  Japan .................................. 423/598

OTHER PUBLICATIONS

Chem. Abstract-JP 53028100 (1978), "Potassium Hexatitanate Fibers" Yanagida et al.

*Primary Examiner*—William R. Dixon, Jr.
*Assistant Examiner*—Paul Marcantoni
*Attorney, Agent, or Firm*—Browdy and Neimark

[57] ABSTRACT

Potassium hexatitanate fibers having a tunnel structure and a free potassium content of 5 ppm or less can be produced by mixing together a titanium containing compound and a potassium containing compound in a ratio represented by the formula $K_2O.nTiO_2$ (wherein n=from 2 to 4); firing the mixing at 900° to 1,200° C. to produce mass of potassium titanate fibers; dipping the mass of product in either cold or hot water to disintegrate the mass of potassium titanate fibers into individual single fibers; adding an acid to the slurry to adjust the pH value to 9.3-9.7, thereby changing the composition of the potassium titanate fibers so that the molar ratio of $TiO_2/K_2O$ is in the range of from 5.95 to 6.00; heating the fibers at 950° to 1,150° C. for 1 hour or more; and washing the fibers with an acid. The potassium hexatitanate fibers, which have minimal free potassium content, i.e., 5 ppm or less, can be suitably used as a reinforcing material for polyester thermoplastic resins, polyphenylene sulfide resins, liquid crystal polymers, aluminum alloys, magnesium alloys and so forth, all of which are easily affected by free potassium.

4 Claims, No Drawings

POTASSIUM HEXATITANATE FIBERS HAVING TUNNEL STRUCTURE, PROCESS FOR PRODUCING THE SAME, AND COMPOSITE MATERIAL CONTAINING SAID FIBERS

BACKGROUND OF THE INVENTION

The present invention relates to potassium hexatitanate fibers having a tunnel structure and a free potassium content of 5 ppm or less which are useful as a reinforcing material for polyester thermoplastic resins, polyphenylene sulfide resins, liquid crystal polymers, aluminum alloys, magnesium alloys and so forth. The present invention also pertains to a process for producing fibers of this type and to a composite material containing said fibers.

Potassium titanate fibers are whiskers of a substance expressed by the formula $K_2O \cdot nTiO_2$ (wherein $n=2$, 4 or 6). These artificial mineral fibers have applications which have been sought in a wide range of fields such as reinforcing materials, heat-insulating materials, ion exchangers and absorption materials.

Potassium titanate fibers have recently come to be regarded as more and more useful reinforcing materials, particularly for thermoplastic resins, for example, polyamide, polyacetal and ABS resin materials.

However, conventional potassium titanate fibers, which have a relatively high content of potassium that can be liberated from the crystalline structure, have heretofore been unable to exhibit satisfactory reinforcing efficiency when used as reinforcing materials for thermoplastic resins (e.g., polyester resins such as polyethylene terephthalates, polybutylene terephthalates and polycarbonates, polyphenylene sulfide resins, liquid crystal polymers, etc.), aluminum and magnesium alloys and so forth, for the following reasons: (1) free potassium decomposes resin materials of the type described above; and (2) free potassium reacts with aluminum or magnesium alloys.

Thus, the conventional potassium titanate fibers, which have a relatively high free potassium content, are not suitable as reinforcing materials for thermoplastic resins, aluminum and magnesium alloys and so forth, which are easily affected by free potassium.

SUMMARY OF THE INVENTION

Accordingly, it is an object of the present invention to provide potassium hexatitanate fibers having a tunnel structure which are useful as a reinforcing material for resins, light alloys and so forth, which are easily affected by free potassium.

It is another object of the present invention to provide a process for producing fibers of the type described above.

It is still another object of the present invention to provide a composite material containing fibers of the type described above.

DETAILED DESCRIPTION OF THE INVENTION

The present inventors conducted exhaustive studies in order to develop potassium hexatitanate fibers having a tunnel structure and a minimized free potassium content and, as a result, have found that it is possible to obtain potassium hexatitanate fibers of the required type by mixing together a titanium containing compound and a potassium containing compound in a ratio represented by the formula $K_2O \cdot nTiO_2$ (wherein $n=$ from 2 to 4), baking the mixture to obtain potassium tetratitanate fibers, treating the resulting fibers with an aqueous acid solution to extract a portion of the $K_2O$ component from the fibers and thereby adjust the composition of the fibers so that the molar ratio of $TiO_2/K_2O$ is in the range of from 5.95 to 6.00, and heating the fibers at 950° to 1,150° C. for 1 hour or more, thereby allowing the free potassium contained in the core of each fiber to move to the fiber surface. Then, by washing off the free potassium with an acid, it is possible to obtain potassium hexatitanate fibers having a tunnel structure in which the molar ratio of $TiO_2/K_2O$ is 6.00 and the content of free potassium is 5 ppm or less, these potassium hexatitanate fibers being useful as a reinforcing material for resins and light alloys which are easily affected by free potassium. The present invention has been accomplished on the basis of this finding.

More specifically, the process of the present invention comprises the steps of: mixing together a titanium containing compound and a potassium containing compound in a ratio represented by the formula $K_2O \cdot nTiO_2$ (wherein $n=$ from 2 to 4); firing the mixture at 900° to 1,200° C. to produce a mass of potassium titanate fibers; dipping the mass of product in either cold or hot water to disintegrate the mass of potassium titanate fibers into individual single fibers; adding an acid to the slurry to adjust the pH value to 9.3–9.7, thereby changing the composition of the potassium titanate fibers so that the molar ratio of $TiO_2/K_2O$ is in the range of from 5.95 to 6.00; heating the fibers at 950° to 1,150° C. for 1 hour or more; and washing the fibers with an acid. Examples of titanium containing compounds which are usable in the present invention include hydrous titanium oxide, titanium dioxide and rutile. Examples of potassium containing compounds usable in the present invention include compounds which generate $K_2O$ during baking process, e.g., $K_2O$, KOH, $K_2CO_3$ and $KNO_3$.

The baking temperature is preferably selected within the range of from 900° to 1,200° C. More specifically, if the baking temperature is lower than 900° C., the reaction is slow and the resulting potassium titanate fibers are short. A baking temperature higher than 1,200° C. causes the apparatus to become quickly corroded and is therefore impractical. It is appropriate to set the baking time in the range of from 1 to 10 hours, preferably from 3 to 5 hours.

The disintegrating of the mass of baked product is conducted in such a manner that the baked product is dipped in an appropriate amount of either water or hot water for 1 to 5 hours and then stirred.

The pH of the slurry upon completion of the disintegrating will depend on the slurry concentration but is usually about 12–13. In this slurry, potassium titanate fibers are either in the state of a single phase of a hydrate of potassium tetratitanate or in that of a mixed phase of a hydrate of potassium tetratitanate and potassium hexatitanate fibers. Therefore, even if the series of processes including filtration, washing, drying and baking are carried out in this state, it is impossible to obtain a single phase of potassium hexatitanate fibers having a tunnel structure which can be regarded as satisfactorily in terms of both physical and chemical properties among the various kinds of potassium titanate, but the resulting potassium titanate fibers include potassium tetratitanate fibers that have a lamellar structure. The potassium contained in potassium tetratitanate behaves as free potassium in a composite material composed of these fibers and a resin material or a light alloy. Accordingly, it is necessary to minimize the potassium tetratitanate content in the final product in order to reduce the amount of free potassium.

For this reason, an acid is added to the slurry after completion of the disintegrating to adjust the pH value of the slurry to 9.3-9.7 for the purpose of obtaining a single phase of potassium hexatitanate fibers having a tunnel structure. If the pH value is higher than 9.7, the molar ratio of $TiO_2/K_2O$ becomes smaller than 5.95, so that potassium tetratitanate having a lamellar structure is undesirably left even if the subsequent heat treatment is carried out. It is, therefore, impossible to reduce the free potassium content in the final product to 5 ppm or less. If the pH value is lower than 9.3, an excessive amount of potassium ions are extracted from the hydrate of potassium tetratitanate, so that titanium oxide is formed on the surfaces of the potassium hexatitanate fibers prepared as the final product, which results in lowering of the fiber strength. Accordingly, it is impossible to obtain potassium titanate fibers which can be suitably used as a reinforcing material.

Examples of acids which are usable in adjusting the pH value of the slurry include sulfuric acid, hydrochloric acid, nitric acid, phosphoric acid and acetic acid.

The temperature of the heating process applied after the composition changing treatment is preferably in the range of from 950° to 1,150° C., and the heating time is 1 hour or more, preferably 1 to 3 hours.

If the heating temperature is lower than 950° C., a very small amount of potassium tetratitanate having a lamellar structure remains in the core of each fiber and, therefore, if fibers are broken when they are mixed with a resin material or a light alloy to form a composite material, free potassium emerges through the ruptured surfaces to (1) decompose the resin material or (2) react with the light alloy.

A heating temperature higher than 1,150° C. causes the fibers to be undesirably sintered and become unsuitable as a reinforcing material.

The washing with an acid is a process for removing free potassium that has moved from the core of each fiber to the surface during the heat treatment and this washing process is conducted by dispersing the fibers in either cold or hot water and adding an acid to the dispersion to adjust the pH value to 7 or less, preferably, to 3-5. It should be noted that the free potassium content in the potassium titanate fibers can be determined in such a manner that a predetermined amount of potassium titanate fibers is dispersed in water and boiled to elute potassium and the amount of eluted potassium is measured by high-frequency inductive coupling plasma emission spectrochemical analysis, flame spectrochemical analysis, atomic-absorption spectroscopy or other similar means. Since the potassium liberated from the crystalline structure of potassium titanate is present in the aqueous solution after the boiling in the form of potassium hydroxide, the free potassium content can be determined by measuring the pH value of the solution and making a predetermined calculation on the basis of this measured pH value.

The potassium hexatitanate fibers having a tunnel structure which are produced according to the present invention have a minimal free potassium content, i.e., 5 ppm or less, and therefore can be suitably used as a reinforcing material for polyester thermoplastic resins, polyphenylene sulfide resins, liquid crystal polymers, aluminum alloys, magnesium alloys and so forth, which are easily affected by free potassium.

The present invention will be described hereinunder more specifically by way of Examples. However, these Examples are presented only for the purpose of illustration and in no way restrict the scope of the present invention.

EXAMPLE 1

Anatase type titanium oxide (1,400 g) and potassium carbonate (800 g) were mixed together in a dry process. The mixture was put in an alumina crucible and baked in an electric furnace under the following conditions: the heating rate was 250° C./hour, the baking temperature was 1,050° C. and the retention time was 3 hours; and the temperature was then lowered to a rate of 200° C./hour.

The baked product was dipped in 10 l of hot water contained in a vessel made of stainless steel for 5 hours. Thereafter, stirring was started at 600 rpm and the bath temperature was adjusted at 60° C. Then, 5N-hydrochloric acid was added dropwise to the slurry to adjust the pH value to 9.5. As the stirring was continued, potassium ions were eluted from between the layers of potassium tetratitanate to raise the pH value. In this Example, hydrochloric acid was dropped at regular intervals of 30 minutes until the rise in the pH value in the case where stirring was continued for 30 minutes after the dropping of hydrochloric acid was 0.1 or less, thus adjusting the pH value to 9.5.

After filtration, baking was conducted at 1,000° C. for 3 hours. The baked product was dispersed in 10 l of hot water and then 1N-hydrochloric acid was added thereto dropwise to adjust the pH value to 4. Thereafter, filtration and drying were carried out to obtain potassium titanate fibers.

Identification of the resulting fibers by X-ray diffraction revealed that the final product was a single phase of potassium hexatitanate fibers having a tunnel structure. Observation of the fibers with a light microscope revealed that the average fiber length was about 80 μm.

COMPARATIVE EXAMPLE

The procedure of Example 1 was repeated except that the baking temperature after the composition changing treatment was lowered to 850° C. from 1,000° C. in Example 1, thereby obtaining a single phase of potassium hexatitanate fibers having a tunnel structure and an average fiber length of about 80 μm.

Next, the products respectively obtained in Example 1 and Comparative Example were pulverized with (1) a power mill (P-3 of Dalton Corporation) and (2) a mortar (AGA of Ishikawa-Kojo Mfg. Co., Ltd.) Thereafter, a predetermined amount of each of the pulverized products was sampled and dispersed in water and then boiled for 10 minutes. The content of potassium ions in the aqueous solution was analyzed with a high-frequency inductive coupling plasma emission spectrochemical analyzer (ICAP-505 of Nippon Jarrel-Ash), while the content of chlorine ions in the aqueous solution was analyzed with a spectrophotometer (100-0101 of Hitachi, Ltd.).

The potassium contained in each of the products in the form of potassium chloride was thus removed and the amount of free potassium eluted from the crystalline structure of potassium titanate was calculated. The results are shown in Table 1.

It should be noted that the fiber length of each of the pulverized products was about 60 μm in the case of (1) P-3 type power mill and about 7 μm in the case of (2) AGA type mortar. Thus, there was no significant difference between the products respectively obtained in Example 1 and the Comparative Example.

TABLE 1

| Samples | Free potassium content (ppm) | |
|---|---|---|
| | (1) Pulverized with power mill | (2) Pulverized with AGA type mortar |
| Potassium titanate fibers according to the present invention | 0.4 | 2.0 |
| Potassium titanate fibers according to the Comparative Example | 1.1 | 30 |

It will be clear from Table 1 that the free potassium content of the potassium titanate fibers according to the present invention is much smaller than that in the case of the Comparative Example and the difference therebetween is particularly obvious when the fibers are broken to a substantial extent by pulverization.

It will be clear from the above that the potassium titanate fibers of the present invention have been cleared of free potassium as far as the core of each fiber.

EXAMPLE 2

Utility of the potassium titanate fibers according to the present invention was examined in regard to polycarbonate which is considered to be one of the resin materials most easily affected by free potassium.

Seventy parts of a polycarbonate resin [Iupilon S-2000 (trade name) of Mitsubishi Gas Chemical Company Inc.] and 30 parts of the potassium titanate fibers [treated with an epoxy silane coupling agent (0.5%)] were melted and kneaded at 290° C. with a twin-screw extruder (AS-30 of Nakatani Machinery Co., Ltd.). Thereafter, the resulting strands were water-cooled and cut to obtain pellets.

The pellets were injection-molded (cylinder temperature: 290° C.; mold temperature: 90° C.) with an injection molding machine (SAV-30-30 of Sanjo Seiki Co., Ltd.) to obtain specimens for tensile and flexural tests.

The tensile and flexural tests were conducted in conformity with JIS K7113 and JIS K7203, respectively. The results are shown in Table 2.

TABLE 2

| | Product filled with potassium titanate of the present invention | Product filled with potassium titanate of the Comparative Example |
|---|---|---|
| Tensile strength (kgf/cm$^2$) | 910 | 780 |
| Flexural strength (kgf/cm$^2$) | 1,520 | 1,230 |
| Flexural modulus (kgf/cm$^2$) | 76,000 | 58,000 |
| Color of specimen | white | yellowish white |

As will be clear from Table 2, the reinforcing effectiveness of the potassium titanate fibers according to the present invention is much greater than that in the case of the Comparative Example.

The fact that the specimen filled with the potassium titanate of the Comparative Example was yellowish revealed that the resin material had decomposed.

Accordingly, it is judged that the resin material was decomposed because of the high free potassium content in the potassium titanate of the Comparative Example and the reinforcing efficiency thus deteriorated.

EXAMPLE 3

Eighty-five parts of a polycarbonate resin [Toughlon A-2500 (trade name) of Idemitsu Petrochemical Co., Ltd.] and 15 parts of the potassium titanate fibers were melted and kneaded at 290° C. to form pellets with a twin-screw extruder (AS-30 of Nakatani Machinery Co., Ltd.) The resulting pellets were injection-molded under the same conditions as in Example 2 to prepare specimens for measurement of strength. The results of the tests are shown in Table 3.

TABLE 3

| | Product filled with potassium titanate of the present invention | Product filled with potassium titanate of the Comparative Example |
|---|---|---|
| Tensile strength (kgf/cm$^2$) | 770 | 650 |
| Flexural strength (kgf/cm$^2$) | 1,350 | 1,150 |
| Flexural modulus (kgf/cm$^2$) | 62,000 | 45,000 |
| Color of specimen | white | yellowish white |

EXAMPLE 4

Forty parts of a polycarbonate resin [Iupilon S-2000 (trade name) of Mitsubishi Gas Chemical Company Inc.], 40 parts of an ABS resin [Cycolac UT-30 (trade name) of Ube-Cycon] and 20 parts of the potassium titanate fibers [treated with an epoxy silane coupling agent (1.0%)] were melted and kneaded 280° C. to form pellets.

The resulting pellets were injection-molded under the same conditions as in Example 2 to prepare specimens for measurement of strength. The results of the tests are shown in Table 4.

TABLE 4

| | Product filled with potassium titanate of the present invention | Product filled with potassium titanate of the Comparative Example |
|---|---|---|
| Tensile strength (kgf/cm$^2$) | 800 | 680 |
| Flexural strength (kgf/cm$^2$) | 1,210 | 950 |
| Flexural modulus (kgf/cm$^2$) | 53,000 | 38,000 |

EXAMPLE 5

Seventy parts of a polybutylene terephthalate resin [Duranex 2000 (trade name) of Polyplastics Co., Ltd.] and 30 parts of the potassium titanate fibers [treated with an epoxy silane coupling agent (0.8%)] were melted and kneaded at 250° C. with a twin-screw extruder (AS-30 of Nakatani Machinery Co., Ltd.) to form pellets. The resulting pellets were injection-molded (cylinder temperature: 250° C.; mold temperature: 70° C.) with an injection molding machine (SAV-30-30 of Sanjo Seiki Co., Ltd.) to prepare specimens for tensile and flexural tests. The results of the tests are shown in Table 5.

TABLE 5

| | Product filled with potassium titanate of the present invention | Product filled with potassium titanate of the Comparative Example |
|---|---|---|
| Tensile strength (kgf/cm$^2$) | 1,150 | 1,010 |
| Flexural strength (kgf/cm$^2$) | 1,980 | 1,680 |
| Flexural modulus (kgf/cm$^2$) | 105,000 | 83,000 |

EXAMPLE 6

Tests were conducted under the same conditions as in Example 5 except that the ratio of the polybutylene terephthalate resin to the potassium titanate fibers was 85:15. The results of the tests are shown in Table 6.

TABLE 6

| | Product filled with potassium titanate of the present invention | Product filled with potassium titanate of the Comparative Example |
|---|---|---|
| Tensile strength (kgf/cm$^2$) | 810 | 690 |
| Flexural strength (kgf/cm$^2$) | 1,360 | 1,050 |
| Flexural modulus (kgf/cm$^2$) | 63,000 | 49,000 |

EXAMPLE 7

Sixty parts of a polyphenylene sulfide resin [Fortron KPS #214 (trade name) of Kureha Chemical Industry Co., Ltd.] and 40 parts of the potassium titanate fibers [treated with an epoxy silane coupling agent (1.0%)] were melted and kneaded at 320° C. to form pellets with a twin-screw extruder (AS-30 of Nakatani Machinery Co., Ltd.).

The resulting pellets were injection-molded (cylinder temperature: 320° C.; mold temperature: 150° C.) with an injection molding machine (SAV-30-30 of Sanjo Seiki Co., Ltd.) to prepare specimens for tensile and flexural tests. The results of the tests are shown in Table 7.

TABLE 7

| | Product filled with potassium titanate of the present invention | Product filled with potassium titanate of the Comparative Example |
|---|---|---|
| Tensile strength (kgf/cm$^2$) | 1,450 | 1,230 |
| Flexural strength (kgf/cm$^2$) | 1,930 | 1,780 |
| Flexural modulus (kgf/cm$^2$) | 128,000 | 111,000 |

EXAMPLE 8

Tests were conducted under the same conditions as in Example 7 except that the ratio of the polyphenylene sulfide resin to the potassium titanate fibers was 80:20. The results are shown in Table 8.

TABLE 8

| | Product filled with potassium titanate of the present invention | Product filled with potassium titanate of the Comparative Example |
|---|---|---|
| Tensile strength (kgf/cm$^2$) | 1,130 | 960 |
| Flexural strength (kgf/cm$^2$) | 1,250 | 1,080 |
| Flexural modulus (kgf/cm$^2$) | 94,000 | 66,000 |

EXAMPLE 9

The potassium titanate fibers were dispersed in water and then silicic acid was added to and mixed with the dispersion in an amount of 5% with respect to the total weight of the fibers. Thereafter, the mixture was filtered and dried to prepare a fiber preform having a fiber content of 20 vol %.

Next, the preform was preheated to about 700° C. and then put in a mold heated to 250° C. in advance. Thereafter, molten 6061 material at about 750° C. was poured into the mold and a pressure of 1,000 kg/cm$^2$ was immediately applied thereto. With the pressure being applied, the mixture in the mold was quickly cooled and thereby solidified to prepare a composite material of 6061 and potassium titanate fibers.

The resulting composite material was subjected to a solid solution treatment at 530° C. for 3 hours and an artificial aging treatment at 180° C. for 8 hours. Thereafter, the composite material was cut in the direction of width of the preform with a cutting-off wheel to prepare a prismatic specimen equivalent to JIS No. 4, the specimen having threaded portions at two ends thereof, and the tensile strength was measured at room temperature. The results are shown in Table 9.

TABLE 9

| | Composite material of 6061 and potassium titanate of the present invention | Composite material of 6061 and potassium titanate of the Comparative Example |
|---|---|---|
| Tensile strength (kgf/mm$^2$) | 45 | 32 |

EXAMPLE 10

The same preform as in Example 9 was preheated to about 700° C. and then put in a mold heated to 250° C. in advance. Thereafter, molten AC8A material at about 700° C. was poured into the mold and a pressure of 1,000 kg/cm$^2$ was immediately applied thereto. With the pressure being applied, the mixture in the mold was quickly cooled and thereby solidified to prepare a composite material of AC8A and the potassium titanate fibers.

The resulting composite material was subjected to a solid solution treatment at 510° C. for 4 hours and an artificial aging treatment at 170° C. for 10 hours. Thereafter, specimens were prepared in the same way as in Example 9 and the tensile strength was measured. The results are shown in Table 10.

TABLE 10

| | Composite material of AC8A and potassium titanate of the present invention | Composite material of AC8A and potassium titanate of the Comparative Example |
|---|---|---|
| Tensile strength (kgf/mm$^2$) | 36 | 24 |

EXAMPLE 11

The potassium titanate fibers were dispersed in water and then silicic acid was added to the dispersion in an amount of 6% with respect to the total weight of the fibers. Thereafter, the mixture was filtered, pressurized and dried to prepare a preform having a fiber content of 30 vol %.

Next, the preform was preheated to about 700° C. and then put in a mold heated to 250° C. in advance. Thereafter, molten AC7A material at about 710° C. was poured into the mold and a pressure of 1,000 kg/cm$^2$ was immediately applied thereto. With the pressure being applied, the mixture in the mold was quickly cooled and thereby solidified to prepare a composite material of AC7A and potassium titanate fibers.

Specimens were prepared in the same way as in Example 9 and the tensile strength was measured. The results are shown in Table 11.

TABLE 11

| | Composite material of AC7A and potassium titanate of the present invention | Composite material of AC7A and potassium titanate of the Comparative Example |
|---|---|---|
| Tensile strength (kgf/mm$^2$) | 41 | 34 |

What is claimed is:

1. A potassium hexatitanate fiber having a tunnel structure characterized in that the free potassium content is 5 ppm or less.

2. A potassium hexatitanate fiber according to claim 1 wherein the molar ratio of $TiO_2/K_2O$ is approximately 6.00.

3. A potassium hexatitanate fiber according to claim 1 which is substantially free of potassium ion.

4. A reinforcing material for thermoplastic materials comprising a mixture of a plurality of potassium hexatitanate fibers according to claim 1.

* * * * *